United States Patent [19]

Yokogawa et al.

[11] Patent Number: 5,478,936
[45] Date of Patent: Dec. 26, 1995

[54] ASYMMETRIC DIOXAZINE COMPOUNDS AND METHOD FOR DYEING OR PRINTING FIBER MATERIALS USING THE SAME

[75] Inventors: Kazufumi Yokogawa, Toyonaka; Miyao Takahashi, Minoo; Takahiko Fuzisaki, Takarazuka; Yutaka Kayane, Ikoma; Shigeru Kawabata; Naoki Harada, both of Ibaraki, all of Japan

[73] Assignee: Sumitomo Chemical Company, Limited, Osaka, Japan

[21] Appl. No.: 215,396

[22] Filed: Mar. 21, 1994

Related U.S. Application Data

[63] Continuation of Ser. No. 741,595, Aug. 7, 1991, abandoned.

[30] Foreign Application Priority Data

Aug. 21, 1990 [JP] Japan .................. 2-220470
May 24, 1991 [JP] Japan .................. 3-149813

[51] Int. Cl.⁶ ................ C07D 498/04; C09B 62/04; C09B 62/503
[52] U.S. Cl. ................ 544/76; 544/77; 8/404; 8/436; 8/543; 8/549
[58] Field of Search ................ 544/76, 77; 8/404, 8/436, 543, 549

[56] References Cited

U.S. PATENT DOCUMENTS

| | | | |
|---|---|---|---|
| 4,568,742 | 2/1986 | Harms et al. | 544/76 |
| 4,780,107 | 10/1988 | Sawamoto et al. | 8/657 |
| 4,933,446 | 6/1990 | Sawamoto et al. | 544/76 |
| 5,019,134 | 5/1991 | Ridyard et al. | 544/77 |
| 5,057,609 | 10/1991 | Jäger | 544/77 |
| 5,122,605 | 6/1992 | Pedrazzi | 544/76 |
| 5,126,450 | 6/1992 | Smith | 544/76 |

FOREIGN PATENT DOCUMENTS

| | | |
|---|---|---|
| 208829 | 1/1987 | European Pat. Off. . |
| 0356014 | 2/1990 | European Pat. Off. . |
| 1477071 | 6/1977 | United Kingdom . |

*Primary Examiner*—Philip I. Datlow
*Attorney, Agent, or Firm*—Stevens, Davis, Miller & Mosher

[57] ABSTRACT

An asymmetric dioxazine compound represented by the following formula (I) in the free acid form:

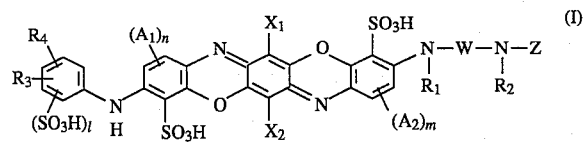

wherein $A_1$ and $A_2$ independently of one another are each sulfo, halo, alkyl or alkoxy, W is an unsubstituted or substituted aliphatic or aromatic bridging group, $X_1$ and $X_2$ independently of one another are each hydrogen, halo, alkyl, alkoxy or phenoxy, $R_1$ and $R_2$ independently of one another are each hydrogen or unsubstituted or substituted alkyl, $R_3$ and $R_4$ independently of one another are each hydrogen, halo, alkyl, alkoxy or unsubstituted or substituted amino, Z is a fiber-reactive group, m and n independently of one another are each 0 or 1, provided that m≠n, and l is 1 or 2. This compound is suitable for dyeing and printing cellulose fiber, natural and synthetic polyamide fibers, polyurethane fiber, leather and the like and mixed yarns thereof, to obtain dyed or printed products of a color fast to light, wetness and chlorine with superior build-up and level dyeing properties.

10 Claims, No Drawings

ASYMMETRIC DIOXAZINE COMPOUNDS AND METHOD FOR DYEING OR PRINTING FIBER MATERIALS USING THE SAME

This application is a continuation of application Ser. No. 07/741,595, filed Aug. 7, 1991 now abandoned.

The present invention relates to asymmetric dioxazine compounds suitable for use in dyeing and printing materials containing hydroxyl group and/or amide group, particularly those such as cellulose fiber, natural and synthetic polyamide fibers, polyurethane fiber, leather and mixed yarns thereof, to obtain dyed or printed products of a color fast to light, wetness and chlorine.

There are known some reactive dyes having a dioxazine skeleton in their molecular structure. However, they are yet insufficient in dye performances, such as level dyeing property, build-up property, dyeing velocity and fastness properties, particularly such as chlorine fastness. Particularly, in case of dyeing or printing the hydroxyl group-containing fiber materials, fastness properties of dyed or printed products, particularly such as chlorine fastness, is not satisfactory. The present inventors have conducted extensive studies, and as a result, asymmetric dioxazine compounds capable of solving the above-mentioned problem have been found.

The present invention provides asymmetric dioxazine compounds represented by the following formula (I) in the free acid form:

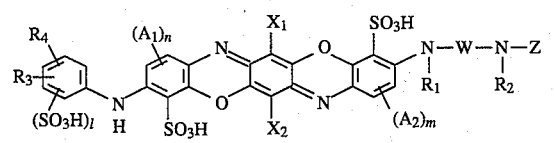

wherein $A_1$ and $A_2$ independently of one another are each sulfo, halo, alkyl or alkoxy, W is an unsubstituted or substituted aliphatic or aromatic bridging group, $X_1$ and $X_2$ independently of one another are each hydrogen, halo, alkyl, alkoxy or phenoxy, $R_1$ and $R_2$ independently of one another are each hydrogen or unsubstituted or substituted alkyl, $R_3$ and $R_4$ independently of one another are each hydrogen, halo, alkyl, alkoxy or unsubstituted or substituted amino, Z is a fiber-reactive group, m and n independently of one another are each 0 or 1, provided that m≠n, and l is 1 or 2.

The present invention further provides a method for dyeing or printing fiber materials, which comprises using said asymmetric dioxazine compounds.

As to the symbols $A_1$ and $A_2$, the halo includes, for example, chloro and bromo, the alkoxy includes those of 1 to 4 carbon atoms such as methoxy and ethoxy, and the alkyl includes those of 1 to 4 carbon atoms such as methyl and ethyl. Among the groups represented by $A_1$ and $A_2$, sulfo is particularly preferable.

The unsubstituted or substituted alkyl represented by $R_1$ and $R_2$, includes those of 1 to 4 carbon atoms. Examples of the substituent of the alkyl are hydroxy, cyano, alkoxy, halo, carbamoyl, carboxy, $C_1$-$C_4$ alkoxycarbonyl, $C_1$-$C_4$ alkylcarbonyloxy, sulfo, sulfamoyl and the like.

Among the groups represented by $R_1$ and $R_2$, hydrogen is particularly preferable.

As examples of the halo, alkoxy and alkyl represented by $R_3$ and $R_4$, chloro and bromo, methoxy and ethoxy, and methyl and ethyl can be referred to, respectively.

Examples of the unsubstituted or substituted amino represented by $R_3$ and $R_4$, include $NH_2$— and amino substituted once or twice by $C_1$-$C_4$ alkyl.

As the group represented by $X_1$ and $X_2$, the halo is particularly preferable, among which chloro and bromo are most preferable.

As the unsubstituted or substituted aliphatic bridging groups represented by W, $C_2$-$C_4$ alkylene groups can be referred to, among which ethylene and propylene are particularly preferable.

As the unsubstituted or substituted aromatic bridging groups represented by W, phenylene and naphthylene unsubstituted or substituted once, twice or three times by sulfo can be referred to, among which phenylene groups substituted once or twice by sulfo are particularly preferred.

In the present invention, the fiber-reactive group represented by Z is intended to mean those which can react under dyeing or printing conditions with —OH, —NH— or —$NH_2$ group of the hydroxyl and/or amide group-containing materials to form a covalent bond.

More specifically, the fiber reactive group includes aromatic ones having at least one fiber reactive substituent on 5- or 6-membered aromatic hetercyclic ring or mono- or poly-condensed aromatic carbocyclic ring, aliphatic ones and those formed by combination thereof through a suitable bridging group. The heterocyclic ring includes, for example, monoazines, diazines and triazines such as pyridine, pyrimidine, pyridazine, pyrazine, thiazine, oxazine, asymmetric or symmetric triazine and the like, and the carbocyclic ring includes, for example, quinoline, phthalazine, cinnoline, quinazoline, quinoxaline, acridine, phenazine, phenanthridine and the like.

As the reactive substituent on the heterocyclic ring and the carbocyclic ring, halo (Cl, Br or F), ammoniums including hydrazinium, sulfonium, sulfonyl, azide (—$N_3$), thiocyanato, thio, thioether, oxyether, sulfino, sulfo and the like can be referred to.

As the heterocyclic ring type and carbocyclic ring type fiber-reactive group, the followings can be referred to:

2,4-difluorotriazin-6-yl, 2,4-dichlorotriazin-6-yl, monohalo-s-triazinyl groups and particularly monochlorotriazinyl and monofluorotriazinyl groups substituted by alkyl, aryl, amino, monoalkylamino, dialkylamino, aralkylamino, arylamino, alkoxy, aryloxy, alkylthio or arylthio, such as:

2-amino-4-fluorotriazin-6-yl, 2-methylamino-4-fluorotriazin-6-yl, 2-ethylamino-4-fluorotriazin-6-yl, 2-isopropylamino-4-fluorotriazin-6-yl, 2-dimethylamino-4-fluorotriazin-6-yl, 2-diethylamino-4-fluorotriazin-6-yl, 2-β-methoxyethylamino-4-fluorotriazin-6-yl, 2-β-hydroxyethylamino-4-fluorotriazin-6-yl, 2-di(β-hydroxyethylamino)-4-fluorotriazin-6-yl, 2-β-sulfoethylamino-4-fluorotriazin-6-yl, 2-β-sulfoethylmethylamino-4-fluorotriazin-6-yl, 2-carboxymethylamino-4-fluorotriazin-6-yl, 2-di(carboxymethylamino)-4-fluorotriazin-6-yl, 2-sulfomethyl-methylamino-4-fluorotriazin-6-yl, 2-β-cyanoethylamino-4-fluorotriazin-6-yl, 2-benzylamino-4-fluorotriazin-6-yl, 2-β-phenylethylamino-4-fluorotriazin-6-yl, 2-benzylmethylamino-4-fluorotriazin-6-yl, 2-(4'-sulfobenzyl)-amino-4-fluorotriazin-6-yl, 2-cyclohexylamino-4-fluorotriazin-6-yl, 2-(o-, m-, p-methylphenyl)-amino-4-fluorotriazin-6-yl, 2-(o-, m-, p-sulfophenyl)-amino-4-fluorotriazin-6-yl,
2-(2', 5'-disulfophenyl)-amino-4-fluorotriazin-6-yl,
2-(o-, m-, p-chlorophenyl)-amino-4-fluorotriazin-6-yl,
2-(o -, m-, p-methoxyphenyl)-amino-4-fluorotriazin-6-yl,
2-(2'-methyl-4'-sulfophenyl)-amino-4-fluorotriazin-6-yl,
2-(2'-methyl-5'-sulfophenyl)-amino-4-fluorotriazin-6-yl,
2-(2'-chloro-4'-sulfophenyl)-amino-4-fluorotriazin-6-yl,
2-(2'-chloro-5'-sulfophenyl)-amino-4-fluorotriazin-6-yl,
2-(2'-methoxy-4'-sulfophenyl)-amino-4-fluorotriazin-6-yl,
2-(o-, m-, p-carboxyphenyl)-amino-4-fluorotriazin-6-yl,
2-(2',4'-disulfophenyl)-amino-4-fluorotriazin-6-yl,
2-(3',5'-disulfophenyl)-amino-4-fluorotriazin-6-yl,
2-(2'-carboxy-4'-sulfophenyl)-amino-4-fluorotriazin-6-yl,
2-(2'-carboxy-5'-sulfophenyl)-amino-4-fluorotriazin-6-yl,
2-(6'-sulfophenyl-2'-yl)-amino-4-fluorotriazin-6-yl,
2-(4',8'-disulfonaphth-2'-yl)-amino-4-fluorotriazin-6-yl,
2-(6',8'-disulfonaphth-2'-yl)-amino-4-fluorotriazin-6-yl,
2-(N-methylphenyl)-amino-4-fluorotriazin-6-yl,
2-(N-ethylphenyl)-amino-4-fluorotriazin-6-yl,
2-(N-β-hydroxyethylphenyl)-amino-4-fluorotriazin-6-yl,
2-(N-isopropylphenyl)-amino-4-fluorotriazin-6-yl,
2-morpholino-4-fluorotriazin-6-yl,
2-piperidino-4-fluorotriazin-6-yl,
2-(4',6',8'-trisulfonaphth-2'-yl)-4-fluorotriazin-6-yl,
2-(3',6',8'-trisulfonaphth-2'-yl)-4-fluorotriazin-6-yl,
2-(3',6'-disulfonaphth-1'-yl)-4-fluorotriazin-6-yl,
N-methyl-N-( 2,4-dichlorotriazin-6-yl)carbamyl,
N-methyl-N-(2-methylamino-4-chlorotriazin-6-yl)-carbamyl,
N-methyl-N-(2-dimethylamino-4-chlorotriazin-6-yl)-carbamyl,
N-methyl- or N-ethyl-N-(2,4-dichlorotriazin-6-yl)-aminoacetyl,
2-methoxy-4-fluorotriazin-6-yl,
2-ethoxy-4-fluorotriazin-6-yl,
2-phenoxy-4-fluorotriazin-6-yl,
2-(o-, m- or p-sulfophenoxy)-4-fluorotriazin-6-yl,
2-(o-, m- or p-methyl or methoxyphenyl)-4-fluorotriazin-6-yl,
2-β-hydroxyethylmercapto-4-fluorotriazin-6-yl,
2-phenylmercapto-4-fluorotriazin-6-yl,
2-(4'-methylphenyl)-mercapto-4-fluorotriazin-6-yl,
2-(2',4'-dinitrophenyl)mercapto-4-fluorotriazin-6-yl,
2-methyl-4-fluorotriazin-6-yl,
2-phenyl-4-fluorotriazin-6-yl; and
the corresponding 4-chloro- and 4-bromo-triazinyl groups; and the corresponding groups obtained by a halogen interchange using a tertiary base such as trimethylamine, triethylamine, dimethyl-β-hydroxyethylamine, triethanolamine, N,N-dimethylhydrazine, pyridine, picoline, nicotinic acid or isonicotinic acid or sulfinic acid salts, particularly benzenesulfinic acid or hydrogensulfites; and mono-, di- or tri-halopyrimidinyl groups such as:
2,4-dichloropyrimidin-6-yl,
2,3,5-trichloropyrimidin-6-yl,
2,4-dichloro-5-nitro- or -5-methyl- or -5-carboxymethyl- or -5-carboxy- or -5-cyano- or -5-vinyl- or -5-sulfo- or -5-mono-, di- or tri-chloromethyl;- or -5-carboalkoxypyrimidin-6-yl,
2,6-dichloropyrimidine-4-carbonyl,
2,4-dichloropyrimidine-5-carbonyl,
2-chloro-4-methylpyrimidine-5-carbonyl, 2-methyl-4-chloropyrimidine-5-carbonyl,
2-methylthio-4-fluoropyrimidine-5-carbonyl,
6-methyl-2,4-dichloropyrimidine-5-carbonyl,
2,4,6-trichloropyrimidine-5-carbonyl,
2,4-dichloropyrimidine-5-sulfonyl,
or 2-chloroquinoxaline-3-carbonyl,
2- or 3-monochloroquinoxaline-6-carbonyl,
2- or 3-monochloroquinoxaline-6-sulfonyl,
2,3-dichloroquinoxaline-6-carbonyl,
2,3-dichloroquinoxaline-6-sulfonyl,
1,4-dichlorophthalazine-6-sulfonyl or -6-carbonyl,
2,4-dichloroquinazoline-7- or -6-sulfonyl or -6-carbonyl,
2- or 3- or 4-(4',5'-dichloropyridaz-6'-on-1'-yl)-phenylsulfonyl or -carbonyl,
β-(4',5'-dichloropyridaz-6'-on-1'-yl)ethylcarbonyl,
N-methyl-N-(2,3-dichloroquinoxaline-6-sulfonyl)-aminoacetyl,
N-methyl-N-(2,3-dichloroquinoxaline-6-carbonyl)-aminoacetyl; and
the corresponding bromine and fluorine derivative of the above-mentioned chlorine-substituted heterocyclic groups, such as:
2-fluoro-4-pyrimidinyl,
2,6-difluoro-4-pyrimidinyl,
2,6-difluoro-5-chloro-4-pyrimidinyl,
2-fluoro-5,6-dichloro-4-pyrimidinyl,
2,6-difluoro-5-methyl,4-pyrimidinyl,
2-fluoro-5-methyl-6-chloro-4-pyrimidinyl,
2-fluoro-5-nitro-6-chloro-4-pyrimidinyl,
5-bromo-2-fluoro-4-pyrimidinyl,
2-fluoro-5-cyano-4-pyrimidinyl,
2-fluoro-5-methyl-4-pyrimidinyl,
2,5,6-trifluoro-4-pyrimidinyl,
5-chloro-6-chloromethyl-2-fluoro-4-pyrimidinyl,
5-chloro-6-dichloromethyl-2-fluoro-4-pyrimidinyl,
5-chloro-6-trichloromethyl-2-fluoro-4-pyrimidinyl,
5-chloro-2-chloromethyl-6-fluoro-4-pyrimidinyl,
5-chloro-2-dichloromethyl-6-fluoro-4-pyrimidinyl,
5-chloro-2-trichloromethyl-6-fluoro-4-pyrimidinyl,
5-chloro-2-fluorodichloromethyl-6-fluoro-4-pyrimidinyl,
2,6-difluoro-5-bromo-4-pyrimidinyl,
2-fluoro-5-bromo-6-methyl-4-pyrimidinyl,
2-fluoro-5-bromo-6-chloromethyl-4-pyrimidinyl,
2,6-difluoro-5-chloromethyl-4-pyrimidinyl,
2,6-difluoro-5-nitro-4-pyrimidinyl,
2-fluoro-6-methyl-4-pyrimidinyl,
2-fluoro-5-chloro-6-methyl-4-pyrimidinyl,
2-fluoro-5-chloro-4-pyrimidinyl,
2-fluoro-6-chloro-4-pyrimidinyl,
6-trifluoromethyl-5-chloro-2-fluoro-4-pyrimidinyl,
6-trifluoromethyl-2-fluoro-4-pyrimidinyl,
2-fluoro-5-nitro-4-pyrimidinyl,
2-fluoro-5-trifluoromethyl-4-pyrimidinyl,
2-fluoro-5-phenyl- or -5-methylsulfonylmethyl-4-pyrimidinyl, 2-fluoro-5-carboxamido-4-pyrimidinyl,
2-fluoro-5-carbomethoxy-4-pyrimidinyl,
2-fluoro-5-bromo-6-trifluoromethyl-4-pyrimidinyl,
2-fluoro-6-carboxamido-4-pyrimidinyl,
2-fluoro-6-carbomethoxy-4-pyrimidinyl,
2-fluoro-6-phenyl-4-pyrimidinyl,
2-fluoro-6-cyano-4-pyrimidinyl,
2-fluoro-4-dichloromethyl-5-chloropyrimidin-6-yl,
2-fluoro-5-chloropyrimidin-4-yl,
2-methyl-4-fluoro-5-methylsulfonylpyrimidin-6-yl,
2,6-difluoro-5-methylsulfonyl-4-pyrimidinyl,
2,6-dichloro-5-methylsulfonyl-4-pyrimidinyl,
2-fluoro-5-sulfonamido-4-pyrimidinyl,
2-fluoro-5-chloro-6-carbomethoxy-4-pyrimidinyl,
2,6-difluoro-5-trifluoromethyl-4-pyrimidinyl; and
sulfonyl-containing triazine groups such as:
2,4-bis(phenylsulfonyl)-triazin-6-yl,
2-(3'-carboxyphenyl)-sulfonyl-4-chlorotriazin-6-yl,
2-(3'-sulfophenyl)-sulfonyl-4-chlorotriazin-6-yl,
2,4-bis(3'-carboxyphenylsulfonyl)-triazin-6-yl; and
sulfonyl-containing pyrimidine rings, such as:
2-carboxymethylsulfonyl-pyrimidin-4-yl,
2-methylsulfonyl-6-methylpyrimidin-4-yl,
2-methylsulfonyl-6-ethylpyrimidin-4-yl,
2-phenylsulfonyl-5-chloro-6-methyl-pyrimidin-4-yl,
2,6-bis-methylsulfonyl-pyrimidin-4-yl,
2,6-bis-methylsulfonyl-5-chloro-pyrimidin-4-yl,
2,4-bis-methylsulfonyl-pyrimidine-5-sulfonyl,
2-methylsulfonyl-pyrimidin-4-yl,
2-phenylsulfonyl-pyrimidin-4-yl,
2-trichloromethylsulfonyl-6-methyl-pyrimidin-4-yl,
2-methylsulfonyl-5-chloro-6-methyl-pyrimidin-4-yl,
2-methylsulfonyl-5-bromo-6-methyl-pyrimidin-4-yl,
2-methylsulfonyl-5-chloro-6-ethyl-pyrimidin-4-yl,
2-methylsulfonyl-5-chloro-6-chloromethyl-pyrimidin-4-yl,
2-methylsulfonyl-4-chloro-6-methylpyrimidine-5-sulfonyl,
2-methylsulfonyl-5-nitro-6-methylpyrimidin-4-yl,
2,5,6-tris-methylsulfonyl-pyrimidin-4-yl,
2-methylsulfonyl-5,6-dimethyl-pyrimidin-4-yl,
2-ethylsulfonyl-5-chloro-6-methyl-pyrimidin-4-yl,
2-methylsulfonyl-6-chloropyrimidin-4-yl,
2,6-bis-methylsulfonyl-5-chloro-pyrimidin-4-yl,
2-methylsulfonyl-6-carboxypyrimidin-4-yl,
2-methylsulfonyl-5-sulfopyrimidin-4-yl,
2-methylsulfonyl-6-carbomethoxypyrimidin-4-yl,
2-methylsulfonyl-5-carboxypyrimidin-4-yl,
2-methylsulfonyl-5-cyano-6-methoxypyrimidin-4-yl,
2-methylsulfonyl-5-chloropyrimidin-4-yl,
2-sulfoethylsulfonyl-6-methylpyrimidin-4-yl,
2-methylsulfonyl-5-bromopyrimidin-4-yl,
2-phenylsulfonyl-5-chloropyrimidin-4-yl,
2-carboxymethylsulfonyl-5-chloro-6-methylpyrimidin-4-yl,
2-methylsulfonyl-6-chloropyrimidine-4- and -5-carbonyl,
2,6-bis(methylsulfonyl)-pyrimidine-4- or -5-carbonyl,
2-ethylsulfonyl-6-chloropyrimidine-5-sulfonyl,
2,4-bis-(methylsulfonyl)-pyrimidine-5-sulfonyl,
2-methylsulfonyl-4-chloro-6-methylpyrimidine-5-sulfonyl or -carbonyl,
2-chlorobenzothiazole-5- or -6-carbonyl or -5- or -6-sulfonyl;
2-arylsulfonyl- or -alkylsulfonylbenzothiazole-5- or -6-carbonyl or -sulfonyl, such as:
2-phenylsulfonylbenzothiazole-5- or -6-carbonyl or -5- or -6-sulfonyl, and
2-methylsulfonyl- or 2-ethylsulfonylbenzothiazole-5- or -6-sulfonyl or -5- or -6-carbonyl; and
the corresponding 2-sulfonylbenzothiazole-5- or -6-carbonyl or -sulfonyl derivatives having sulfo group in their fused benzene ring,
2-chlorobenzoxazole-5- or -6-carbonyl or -sulfonyl,
2-chlorobenzimidazole-5- or -6-carbonyl or -sulfonyl,
2-chloro-1-methylbenzimidazole-5- or -6-carbonyl or -sulfonyl,
2-chloro-4-methyl-1,3-thiazole-5-carbonyl or -4- or -5-sulfonyl,
4-chloro or 4-nitro-quinoline-5-carbonyl N-oxide, and the like.

As examples of the aliphatic fiber-reactive group, the followings can be referred to:
acryloyl;
mono-, di- and tri-chloroacryloyls such as:
—CO—CH=CH—Cl,
—CO—CCl=CH$_2$,
—CO—CCl=CH—CH$_3$,
—CO—CCl=CH—COOH,
—CO—CH=CCl—COOH;
β-chloropropionyl,
3-phenylsulfonylpropionyl,
3-methylsulfonylpropionyl,
2-fluoro-2-chloro-3,3-difluorocyclobutane-1-carbonyl,
2,2,3,3-tetrafluorocyclobutane-1-carbonyl or -1-sulfonyl,
β-(2,2,3,3-tetrafluorocyclobutyl)-aryloxy,
α- or β-bromoacryloyl,
α- or β-alkyl- or aryl-sulfoacryloyl groups such as:
α- or β-methylsulfonylacryloyl,
chloroacetyl,
vinylsulfonyl,
—SO$_2$CH$_2$CH$_2$Z$_1$ (Z$_1$ represents a group eliminable by the action of alkali), and the like.

Preferable fiber-reactive groups represented by Z are those represented by the following formulas (II) to (IV):

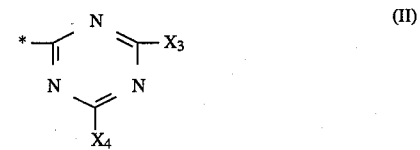

(II)

wherein X$_3$ and X$_4$ independently represent chloro, fluoro,

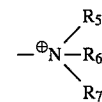

($R_5$, $R_6$ and $R_7$ represent optionally substituted alkyl group) or

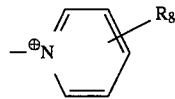

($R_8$ is a hydrogen, cyano, carbamoyl, halo, carboxy, sulfo, hydroxy, vinyl or, unsubstituted or substituted alkyl group) and the mark * represents a bond linking to

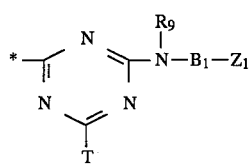

wherein $B_1$ is an unsubstituted or substituted phenylene, alkylene or naphthylene group, $R_9$ is hydrogen or an unsubstituted or substituted alkyl group, $Z_1$ represents —$SO_2CH=CH_2$ or —$SO_2CH_2CH_2Y_1$ ($Y_1$ is a group capable of being split by the action of an alkali), T represents halogen, alkoxy,

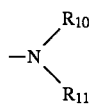

($R_{10}$ and $R_{11}$ independently of one another are each a hydrogen atom or unsubstituted or substituted alkyl, phenyl, naphthyl or benzyl group),

($R_5$, $R_6$ and $R_7$ are as defined above),

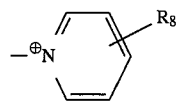

($R_8$ is as defined above) or

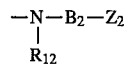

[$B_2$ is an unsubstituted or substituted phenylene, alkylene or naphthylene group, $R_{12}$ is a hydrogen atom or unsubstituted or substituted alkyl group and $Z_2$ is —$SO_2CH=CH_2$ or —$SO_2CH_2CH_2Y_2$ ($Y_2$ is a group capable of being split by the action of an alkali)] and the mark * is as defined above;

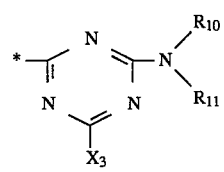

wherein $X_3$, $R_{10}$, $R_{11}$ and the mark * are as defined above.

As the fiber-reactive group represented by Z, groups represented by the following formula (V) are particularly preferable from the viewpoint of dyeing performances:

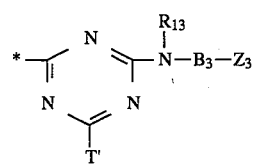

wherein $B_3$ is an unsubstituted or substituted phenylene, alkylene or naphthylene group, $R_{13}$ represents hydrogen or unsubstituted or substituted alkyl group and $Z_3$ represents —$SO_2CH=CH_2$ or —$SO_2CH_2CH_2Y_3$ ($Y_3$ is a group capable of being split by the action of an alkali) and T' represents chloro, fluoro, alkoxy,

($R_{14}$ represents hydrogen or an unsubstituted or substituted alkyl group and $R_{15}$ represents hydrogen or an unsubstituted or substituted alkyl, phenyl or naphthyl group),

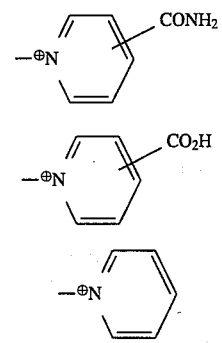

or

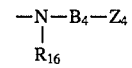

($B_4$ represents an unsubstituted or substituted phenylene, alkylene or naphthylene group, $R_{16}$ is a hydrogen atom or, an unsubstituted or substituted alkyl group, $Z_4$ is —$SO_2CH=CH_2$ or —$SO_2CH_2CH_2Y_4$ ($Y_4$ is a group capable of being split by the action of an alkali) and the mark * is as defined above.

As examples of the unsubstituted or substituted alkylene group represented by $B_1$, $B_2$, $B_3$ and $B_4$, —$(CH_2)_2$—, —$(CH_2)_3$—, —$(CH_2)_2O(CH_2)_2$— and the like can be referred to. As said unsubstituted or substituted phenylene or naphthylene group, phenylene groups unsubstituted or substituted once or twice by substituent(s) selected from the group consisting of methyl, ethyl, methoxy, ethoxy, chloro, bromo and sulfo, and naphthylene groups unsubstituted or substituted once by sulfo are preferable, of which concrete examples include the followings:

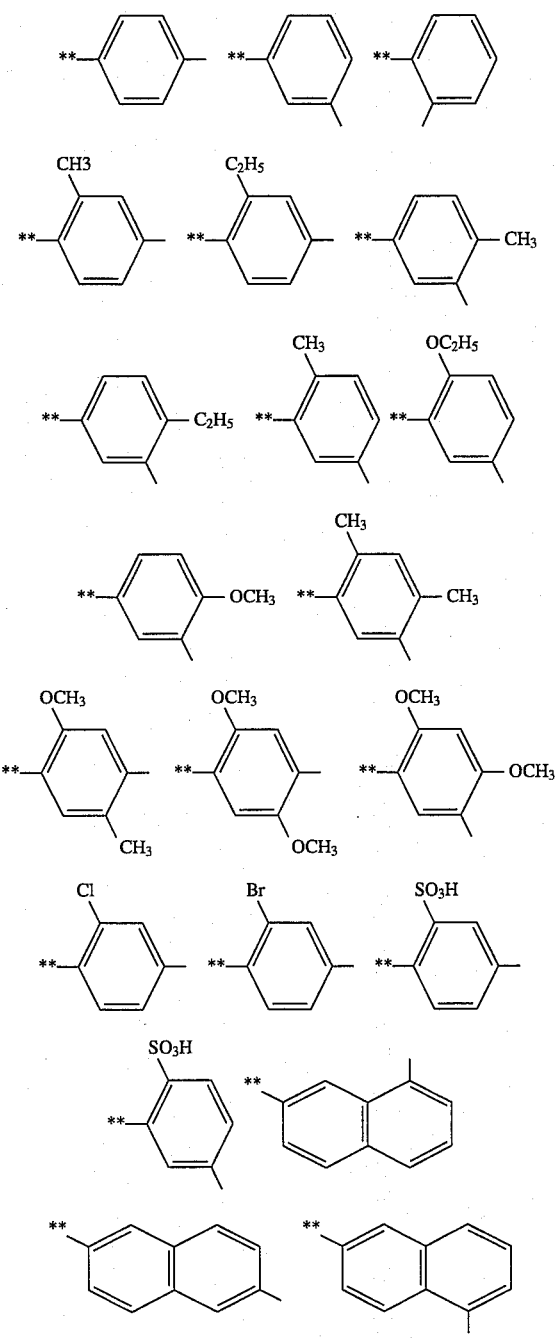

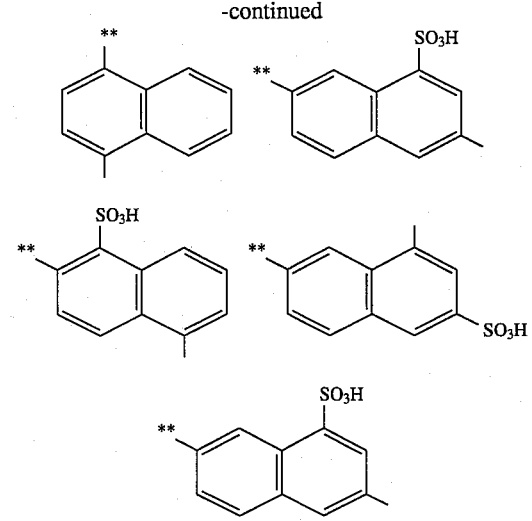

wherein the marke ** represents a bond linking to

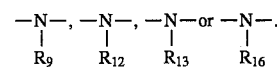

As examples of the alkyl or alkoxy group represented by $X_1$ and $X_2$, $C_1$–$C_4$ alkyl groups and $C_1$–$C_4$ alkoxy groups can be referred to.

As examples of the group capable of being split by the action of an alkali represented by $Y_1$, $Y_2$, $Y_3$ and $Y_4$, sulfuric ester group, thiosulfuric ester group, phosphoric ester group, acetic ester group, halogen and the like can be referred to, among which sulfuric ester group is most preferable.

As examples of the unsubstituted or substituted alkyl group represented by $R_9$, $R_{12}$, $R_{13}$ and $R_{16}$, the followings can be referred to: a $C_1$–$C_4$ alkyl group such as methyl, ethyl, n-propyl, iso-propyl, n-butyl, iso-butyl, sec-butyl, 2-hydroxyethyl, 2-hydroxypropyl, 3-hydroxypropyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxymethyl, ethoxymethyl, 2-methoxypropyl, 2-ethoxyethyl, 3-methoxyethyl, 3-ethoxypropyl, 2-hydroxy-3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, methylcarbonyloxymethyl, ethylcarbonyloxymethyl, 2-methylcarbonyloxyethyl, 2-ethylcarbonyloxyethyl, 3-methylcarbonyloxypropyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl and 4-sulfamoylbutyl. As $R_9$, $R_{12}$, $R_{13}$ and $R_{16}$, hydrogen, methyl and ethyl are particularly preferable.

As preferable examples of the unsubstituted or substituted alkyl group represented by $R_{10}$, $R_{11}$, $R_{14}$ and $R_{15}$, alkyl groups having 1 to 4 carbon atoms unsubstituted or substituted once or twice by a member selected from the group consisting of alkoxy groups having 1 to 4 carbon atoms, sulfo group, carboxy group, hydroxy group, chloro, phenyl group and sulfato group can be referred to.

Among them, particularly preferable are methyl, ethyl, n-propyl, iso-propyl, n-butyl, iso-butyl, sec-butyl, β-hydroxyethyl, β-sulfatoethyl, β-sulfoethyl, β-methoxyethyl, β-carboxyethyl and the like.

As preferable examples of the unsubstituted or substituted phenyl group represented by $R_{10}$, $R_{11}$ and $R_{15}$, phenyl groups unsubstituted or substituted once or twice by a member selected from the group consisting of alkyl groups having 1 to 4 carbon atoms, alkoxy groups having 1 to 4 carbon atoms, sulfo group, carboxy group, chloro and bromo can be referred to.

Among them, phenyl, 2-, 3- or 4-sulfophenyl, 2,4- or 2,5-disulfonphenyl, 2-, 3- or 4-carboxydiphenyl, 2-, 3- or 4-chlorophenyl, 2-, 3- or 4-methylphenyl and 2-, 3- or 4-methoxyphenyl and the like are particularly preferable. As preferable examples of the unsubstituted or substituted naphthyl group represented by $R_{10}$, $R_{11}$ and $R_{15}$, naphthyl groups unsubstituted or substituted once, twice or three times by a member selected from the group consisting of hydroxy, carboxy, sulfo, alkyl having 1 to 4 carbon atoms, alkoxy having 1 to 4 carbon atoms and chloro can be referred to.

Among them, particularly preferable are 2-, 3-, 4-, 5-, 6-, 7- or 8-sulfo-1-naphthyl, 1-, 5-, 6-, 7- or 8-sulfo-2-naphthyl, 1,5-, 5,7-, 6,8-, 4,8-, 4,7-, 3,8-, 4,6-, 3,7- or 3,6-disulfo-2-naphthyl, 4,6,8-, 2,4,7- or 3,6,8-trisulfo-1-naphthyl, 1,5,7-, 4,6,8- or 3,6,8-trisulfo-2-naphthyl and the like.

As preferable examples of the unsubstituted or substituted benzyl represented by $R_{10}$ and $R_{11}$, benzyl groups unsubstituted or substituted once or twice by a member selected from the group consisting of alkyl having 1 to 4 carbon atoms, alkoxy having 1 to 4 carbon atoms, sulfo and chloro can be referred to.

Among them, benzyl, 2-, 3- or 4-sulfobenzyl and the like are particularly preferable.

In the present invention, a case that either one of $R_{10}$ and $R_{11}$ is hydrogen, methyl or ethyl and the other of them is a phenyl group unsubstituted or substituted by $C_1$–$C_4$ alkyl, $C_1$–$C_4$ alkoxy, sulfo, carboxy or halogen or a $C_1$–$C_4$ alkyl group unsubstituted or substituted by alkoxy, sulfo, carboxy, hydroxy, chloro or sulfato and a case that $R_{10}$ and $R_{11}$ both are hydrogen atoms are preferable from the viewpoint of dye characteristics. Regarding $R_{14}$ and $R_{15}$, too, the same combinations as in $R_{10}$ and $R_{11}$ are preferable from the viewpoint of dye characteristics.

As examples of compounds represented by $HNR_{10}R_{11}$ and $HNR_{14}R_{15}$ which can be used to form the groups

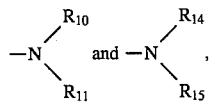

respectively, in the above formulas (III), (IV) and (V) include the followings:

ammonia;

aromatic amines such as:
1-aminobenzene,
1-amino-2-, -3- or -4-methyl-benzene,
1-amino-3,4- or 3,5-dimethylbenzene,
1-amino-2-, -3- or -4-ethylbenzene,
1-amino-2-, -3- or -4-methoxybenzene,
1-amino-2-, -3- or -4-ethoxybenzene,
1-amino-2-, -3- or -4-chlorobenzene,
3- or 4-amino-phenylmethanesulfonic acid,
2-, 3- or 4-aminobenzenesulfonic acid,
3-methylaminobenzenesulfonic acid,
3-ethylaminobenzenesulfonic acid,
4-methylaminobenzenesulfonic acid,
4-ethylaminobenzenesulfonic acid,
5-aminobenzene-1,3-disulfonic acid,
6-aminobenzene-1,3-disulfonic acid,
6-aminobenzene-1,4-disulfonic acid,
4-aminobenzene-1,2-disulfonic acid,
4-amino-5-methylbenzene-1,2-disulfonic acid,
2-, 3- or 4-aminobenzoic acid,
5-aminobenzene-1,3-dicarboxylic acid,
5-amino-2-hydroxybenzenesulfonic acid,
4-amino-2-hydroxybenzenesulfonic acid,
5-amino-2-ethoxybenzenesulfonic acid,
N-methylaminobenzene,
N-ethylaminobenzene,
1-methylamino-3- or -4-methylbenzene,
1-ethylamino-4-chlorobenzene,
1-ethylamino-3- or -4-methylbenzene,
1-(2-hydroxyethyl)-amino-3-methylbenzene,
3- or 4-methylaminobenzoic acid,
3- or 4-methylaminobenzenesulfonic acid,
2-aminonaphthalene-1-sulfonic acid,
4-aminonaphthalene-1-sulfonic acid,
5-aminonaphthalene-1-sulfonic acid,
6-aminonaphthalene-1-sulfonic acid,
7-aminonaphthalene-1-sulfonic acid,
8-aminonaphthalene-1-sulfonic acid,
1-aminonaphthalene-2-sulfonic acid,
4-aminonaphthalene-2-sulfonic acid,
5-aminonaphthalene-2-sulfonic acid,
6-aminonaphthalene-2-sulfonic acid,
7-aminonaphthalene-2-sulfonic acid,
7-methylaminonaphthalene-2-sulfonic acid,
7-ethylaminonaphthalene-2-sulfonic acid,
7-butylaminonaphthalene-2-sulfonic acid,
7-isobutylaminonaphthalene-2-sulfonic acid,
8-aminonaphthalene-2-sulfonic acid,
4-aminonaphthalene-1,3-disulfonic acid,
5-aminonaphthalene-1,3-disulfonic acid,
6-aminonaphthalene-1,3-disulfonic acid,
7-aminonaphthalene-1,3-disulfonic acid,
8-aminonaphthalene-1,3-disulfonic acid,
2-aminonaphthalene-1,5-disulfonic acid,
3-aminonaphthalene-1,5-disulfonic acid,
4-aminonaphthalene-1,5-disulfonic acid,
4-aminonaphthalene-1,6-disulfonic acid,
8-aminonaphthalene-1,6-disulfonic acid,
4-aminonaphthalene-1,7-disulfonic acid,
3-aminonaphthalene-2,6-disulfonic acid,
4-aminonaphthalene-2,6-disulfonic acid,
3-aminonaphthalene-2,7-disulfonic acid,
4-aminonaphthalene-2,7-disulfonic acid,
6-aminonaphthalene-1,3,5-trisulfonic acid,
7-aminonaphthalene-1,3,5-trisulfonic acid,
4-aminonaphthalene-1,3,6-trisulfonic acid,
7-aminonaphthalene-1,3,6-trisulfonic acid,
8-aminonaphthalene-1,3,6-trisulfonic acid, and
4-aminonaphthalene-1,3,7-trisulfonic acid, and aliphatic amines such as:

methylamine,
ethylamine,
n-propylamine,
isopropylamine,
n-butylamine,
isobutylamine,
sec-butylamine,
dimethylamine,
diethylamine,
methylethylamine,
allylamine,
2-chloroethylamine,
2-methoxyethylamine,
2-aminoethanol,
2-methylaminoethanol,
bis-(2-hydroxyethyl)amine,
2-acetylaminoethylamine,
1-amino-2-propanol,
3-methoxypropylamine,
1-amino-3-dimethylaminopropane,
2-aminoethanesulfonic acid,
aminomethanesulfonic acid,
2-methylaminoethanesulfonic acid,
3-amino-1-propanesulfonic acid,
2-sulfatoethylamine,
aminoacetic acid,
methylaminoacetic acid,
ε-aminocaproic acid,
benzylamine,
2-, 3- or 4-chlorobenzylamine,
4-methylbenzylamine,
N-methylbenzylamine,
2-, 3- or 4-sulfobenzylamine,
2-phenylethylamine,
1-phenylethylamine, and
1-phenyl-2-propylamine.

Among them, particularly preferable are ammonia, ethylamine, taurine, N-methyltaurine, methylamine, n-propylamine, monoethanolamine, β-alanine, 2-chloroethylamine, 2-sulfatoethylamine, aniline, aniline-2-, -3- or -4-sulfonic acid, 2-, 3- or 4-carboxyaniline, N-methylaniline, N-ethylaniline, N- ethyl-2-, -3- or -4-chloroaniline, aniline-2,4- or -2,5-disulfonic acid, 2-, 3- or 4-chloroaniline, 2-, 3- or 4-methylaniline, 3- or 4-methylaminobenzenesulfonic acid, and the like.

In the formulas (II), (III) and (IV), preferable examples of the unsubstituted or substituted alkyl group represented by $R_5$, $R_6$ and $R_7$ include alkenyl groups such as allyl; alkyl groups such as $C_1$–$C_4$ alkyl groups (for example, methyl, ethyl, propyl, butyl); and substituted $C_1$–$C_4$ alkyl groups, for example, such as hydroxyalkyl groups (for example, hydroxyethyl and hydroxypropyl), $C_1$–$C_4$ alkoxyalkyl groups (for example, methoxyethyl and ethoxyethyl), aryl-substituted alkyl groups (for example, benzyl, β-phenylethyl), substituted amino alkyl groups (for example, β-dimethylaminoethyl, γ-dimethylaminopropyl, γ-diethylaminopropyl), and carboxy alkyl groups (for example, carboxymethyl, carboxyethyl). Among them, $C_1$–$C_4$ alkyl groups are preferable, and methyl group is particularly preferable.

As examples of the unsubstituted or substituted alkyl group represented by $R_8$, $C_1$–$C_4$ alkyl groups unsubstituted or substituted by hydroxy group and cyano group can be referred to.

As the group represented by $R_8$, hydrogen, carboxy and carbamoyl are preferable, and carboxy is particularly preferable.

Unless otherwise specified in the present invention, the alkyl and the alkoxy are those having 1 to 4 carbon atoms.

The compound of the present invention may be in the form of a free acid. Preferably, however, it is in the form of an alkali metal salt or an alkaline earth metal salt, for example, sodium salt and potassium salt.

The compound (I) of the present invention can be produced, for example, by allowing condensation reaction between an asymmetric dioxazine intermediate represented by the following formula (VI):

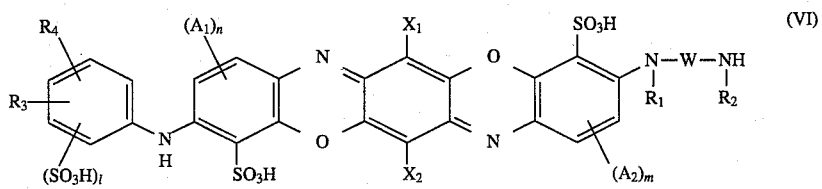

wherein R1, R2, R3, R4, X1, X2, A1, A2, W, m, n and l are as defined above, and a compound represented by the following formula (VII):

X–Z (VII)

wherein X is a halo atom and Z is as defined above. The condensation reaction can be carried out in the presence of a de-hydrogen halide agent.

The asymmetric dioxazine intermediate represented by formula (VI) can be synthesized according to methods well known in themselves. For example, it can be synthesized in the following manner.

An asymmetric dianilide compound represented by the following formula (VIII):

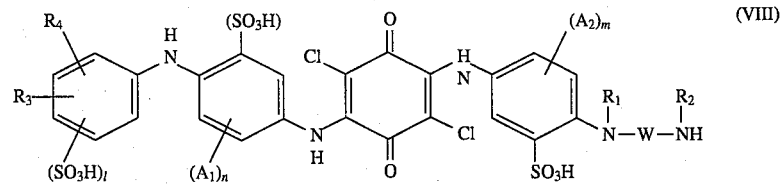

wherein $A_1$, $A_2$, $R_1$, $R_2$, $R_3$, $R_4$, W, m, n and l are as defined above, is synthesized by a condensation reaction between a corresponding aniline compound and chloranil. Then, the asymmetric dianilide compound is cyclized, optionally in the presence of an oxidant, to form an asymmetric dioxazine intermediate of the formula (VI).

The compound of the present invention has a fiber-reactive group and can be used for dyeing or printing a hydroxy group- or carbonamide group-containing material. Preferably, the material to be dyed or printed is used in the form of a fiber material or a mixed woven material thereof.

Said hydroxy group-containing material includes natural and synthetic hydroxy group-containing materials such as cellulose fiber materials, their regenerated products and polyvinyl alcohol. As the cellulose fiber material, cotton and other plant fibers such as linen, flax, jute and ramie fibers are preferable. As the regenerated cellulose fiber, viscose staple and filament viscose can be referred to.

Said carbonamide group-containing material includes synthetic and natural polyamides and polyurethanes. Particularly in the form of a fiber, it includes wool and other animal furs, silk, leather, polyamide-6,6, polyamide-6, polyamide-11 and polyamide-4.

The compound (I) of the present invention can be effectively used for dyeing or printing said materials, particularly those such as fiber materials in a manner depending on physical and chemical properties of the materials. The manner includes, for example, exhaustion dyeing, padding and printing methods.

For example, the exhaustion dyeing method can be carried out at a temperature not exceeding 100° C. in the presence of a neutral salt such as sodium sulfate and sodium chloride, and an acid binding agent such as sodium carbonate, sodium tertiary phosphate, sodium hydroxide, sodium bicarbonate and the like optionally together with dissolving assistants, penetrants or level dyeing agents. The neutral salt which can be used for promoting the exhaustion of the dye may be added in portions, if desired.

The padding method can be carried out by padding the materials at room or elevated temperature, followed by drying and then steaming or dry-heating the padded materials to perform dye-fixation.

The printing can be carried out in a one-phase or two-phase manner. The one-phase printing may be conducted by printing the fiber materials with a printing paste containing an acid binding agent such as sodium bicarbonate and the like, followed by steaming at a temperature of 100° to 160° C. The two-phase printing may be conducted by printing the fiber materials with a neutral or weakly acidic printing paste, and passing the materials through a hot alkaline bath containing an electrolyte or over-padding the materials with an alkaline padding liquor containing an electrolyte, followed by a steaming or dry-heating treatment.

For the preparation of the printing paste, a paste or emulsifier such as starch ether is used optionally together with a conventional printing assistant such as urea and/or a dispersant.

As examples of the acid binding agent suitable for fixing the compound of this invention onto cellulose fiber, water-soluble basic salts formed between an alkali metal or an alkaline earth metal and an inorganic or organic acid or a compound liberating alkali in a heated state can be referred to. Particularly, alkali metal salts formed between an alkali metal hydroxide and an inorganic or organic acid of weak or medium strength are preferable, among which sodium salts and potassium salts are most preferable. Examples of such acid binding agent include sodium hydroxide, potassium hydroxide, sodium bicarbonate, sodium carbonate, sodium formate, potassium carbonate, sodium primary, secondary and tertiary phosphates, sodium silicate, sodium trichloroacetate and the like.

The dyeing of synthetic and natural polyamide and polyurethane fibers can be carried out by performing exhaustion in an acid or weak acid bath at a controlled pH value and then making the bath neutral or in some cases alkaline to perform fixation. The dyeing temperature ranges usually from 600° to 120° C. In order to achiev a level dyeing, there may be used a conventional level dyeing agent such as a condensation product between cyanuric chloride and 3 times by mole of aminobenzenesulfonic acid or aminonaphthalenesulfonic acid or an addition product between stearylamine and ethylene oxide.

The compound of the present invention is characterized in that it exhibits excellent performances in dyeing and printing fiber materials. It is particularly useful for dyeing cellulose fiber materials, and gives a dyed product excellent in light fastness, perspiration-light fastness, wet fastnesses such as washing resistance, peroxide-washing resistance, perspiration resistance, acid hydrolysis resistance and alkali hydrolysis resistance, and particularly in chlorine fastness, abrasion fastness and iron fastness.

It is further characterized by excellency in build-up, level-dyeing and wash-off properties and high solubility as well as high exhaustion and fixation percentages. Moreover, it is characterized in that it is hardly affected by changes in dyeing temperature and dyeing bath ratio, so that a dyed product with a stable quality can be obtained.

Moreover, the compound of the present invention is characterized in that it is resistant to color change at the time of fixing treatment and resin treatment of dyed product and resistant to the change due to contact with basic substances during storage.

The present invention will be illustrated in more detail by way of the following examples, wherein parts and % are by weight.

EXAMPLE 1

An asymmetric dioxazine intermediate (33.8 parts) represented by the following formula in the free acid form:

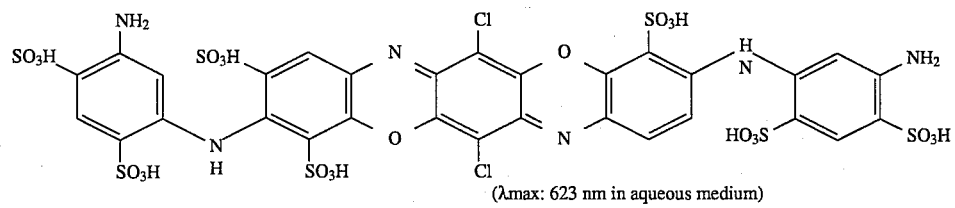

($\lambda$max: 623 nm in aqueous medium)

was added to water (200 parts). Cyanuric chloride (5.5 parts) was added, and the mixture was stirred at a pH value of 5–6 at a temperature of 10°–20° C. until the reaction was completed. Then, 1-aminobenzene-3-β-sulfatoethylsulfone (8.4 parts) was added and stirred at a pH value of 2–4 at a temperature of 30°–50° C. until the reaction was completed. Thus, an asymmetric dioxazine compound represented by the following formula in the free acid form was obtained.

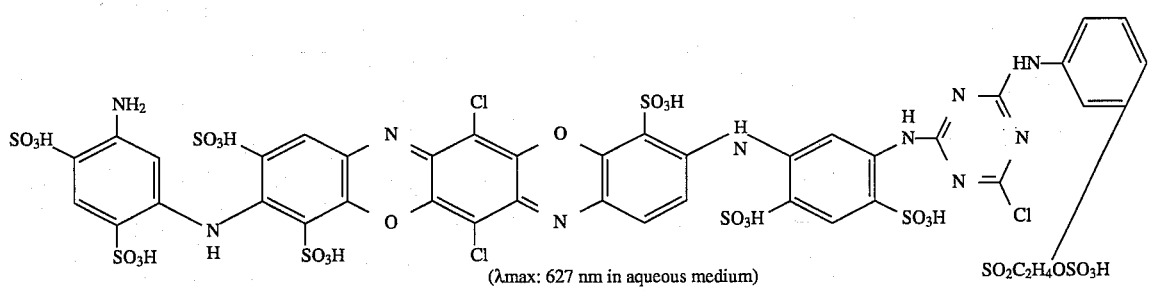

(λmax: 627 nm in aqueous medium)

EXAMPLE 2

Example 1 was repeated, except that the dioxazine intermediate and 1-aminobenzene-3-β-sulfatoethylsulfone used in Example 1 were replaced with the compounds shown in Column 2 and Column 3, respectively, of the following table to obtain the corresponding asymmetric dioxazine compounds. When used for dyeing, these compounds gave dyed products of which hues were as shown in Column 4 of the table.

| Run No. | Column 2 | Column 3 | Column 4 |
|---|---|---|---|
| 1 | [structure: bis-aryl diamine with phenoxazine-type core, Cl substituents, NH2, SO3H groups] | 4-aminophenyl-SO2C2H4OSO3H | Blue |
| 2 | " | 3-(N-ethylamino)phenyl-SO2C2H4OSO3H | " |
| 3 | " | 6-amino-2-naphthyl-SO2C2H4OSO3H | " |
| 4 | [structure: analogous core with CH3 substituents, Cl, NH2, SO3H groups] | 3-aminophenyl-SO2C2H4OSO3H | Blue |
| 5 | " | 4-aminophenyl-SO2C2H4OSO3H | " |
| 6 | [structure: analogous core with Br substituents, NH2, SO3H groups] | 3-aminophenyl-SO2C2H4OSO3H | Greenish blue |

-continued

| Run No. | Column 2 | Column 3 | Column 4 |
|---|---|---|---|
| 7 | (triphenodioxazine structure with Br substituents) | 4-aminophenyl-SO₂C₂H₄OSO₃H | Greenish blue |
| 8 | (triphenodioxazine structure with Cl substituents) | 4-(N-ethylamino)phenyl-SO₂C₂H₄OSO₃H | Blue |
| 9 | " | 4-methoxy-3-amino-phenyl-SO₂C₂H₄OSO₃H | " |
| 10 | (triphenodioxazine structure with Cl substituents) | NH₂C₂H₄OC₂H₄SO₂CH=CH₂ | Blue |
| 11 | " | NH₂C₂H₄SO₂C₂H₄OSO₃H | " |
| 12 | " | 2-(SO₂C₂H₄OSO₃H)-4-amino-methoxyphenyl | " |

-continued

| Run No. | Column 2 | Column 3 | Column 4 |
|---|---|---|---|
| 13 | (structure) | (3-aminophenyl-SO₂C₂H₄OSO₃H) | Blue |
| 14 | (structure) | " | " |
| 15 | (structure) | (4-aminophenyl-SO₂C₂H₄OSO₃H) | " |
| 16 | (structure) | (aminonaphthyl-SO₂C₂H₄OSO₃H) | Blue |
| 17 | (structure) | (3-aminophenyl-SO₂C₂H₄OSO₃H) | " |
| 18 | (structure) | (4-aminophenyl-SO₂C₂H₄OSO₃H) | " |

-continued

| Run No. | Column 2 | Column 3 | Column 4 |
|---|---|---|---|
| 19 | (structure) | 3-aminophenyl-SO₂C₂H₄OSO₃H | Blue |
| 20 | (structure) | " | " |
| 21 | (structure) | " | " |
| 22 | (structure) | 6-amino-2-naphthyl-SO₂C₂H₄OSO₃H | Blue |
| 23 | (structure) | 3-aminophenyl-SO₂C₂H₄OSO₃H | " |

-continued

| Run No. | Column 2 | Column 3 | Column 4 |
|---|---|---|---|
| 24 | (structure) | " | Greenish blue |
| 25 | (structure) | (structure: naphthalene with SO₃H, NH₂, SO₂C₂H₄OSO₃H) | Blue |
| 26 | " | (structure: naphthalene with NH₂, SO₂C₂H₄OSO₃H, SO₃H) | " |
| 27 | " | (structure: naphthalene with NH₂, SO₂C₂H₄OSO₃H) | " |
| 28 | (structure) | (structure: naphthalene with NH₂, SO₃H, SO₂C₂H₄OSO₃H) | Blue |

-continued
| Run No. | Column 2 | Column 3 | Column 4 |
|---|---|---|---|
| 29 | " | 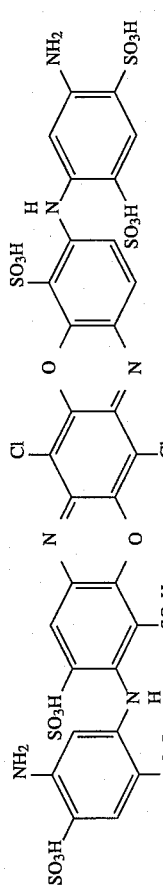 | " |
| 30 | " | 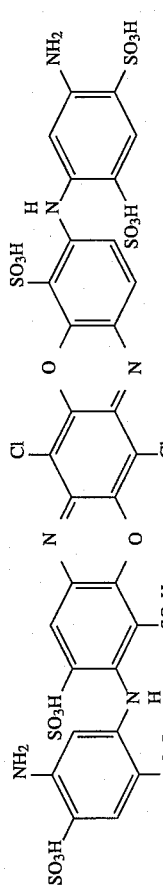 | Blue |
| 31 | 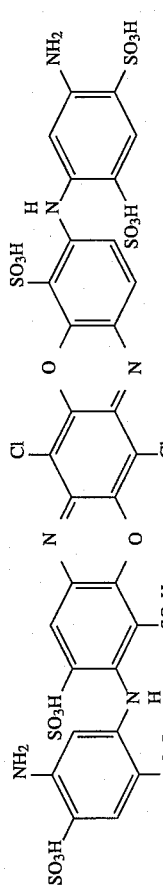 | 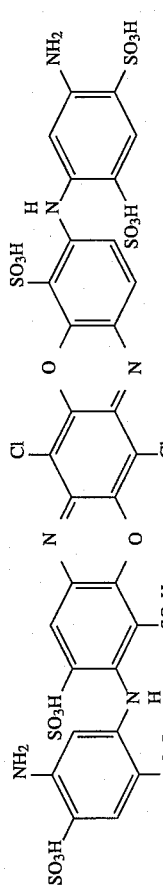 | " |
| 32 | 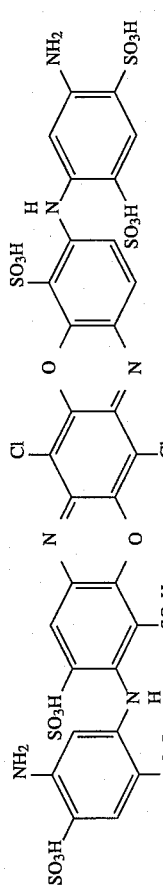 | 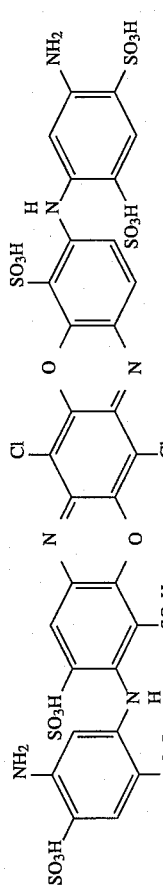 | " |
| 33 | 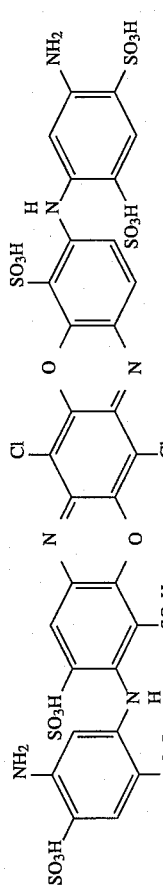 | 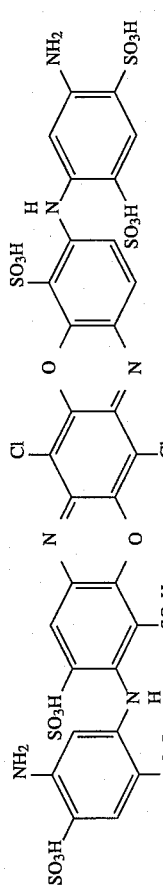 | " |

-continued

| Run No. | Column 2 | Column 3 | Column 4 |
|---|---|---|---|
| 34 | ![structure] | 4-aminophenyl-CONHC₂H₄SO₂C₂H₄OSO₃H structure with NH₂ | Blue |
| 35 | " | NH₂C₂H₄SO₂C₂H₄OSO₃H | " |
| 36 | " | NH₂C₃H₆SO₂C₂H₄OSO₃H | " |

EXAMPLE 3

1-Aminobenzene-2,5-disulfonic acid (25.3 parts) and cyanuric chloride (18.4 parts) were subjected to a condensation reaction in water medium at pH 3–5 at 0°–20° C. To the reation mixture was added the same dioxazine intermediate (112.7 parts) as used in Example 1, and the condensation reaction was further made to progress. After the reaction, 1-aminobenzene-3-β-sulfatoethylsulfone (28.1 parts) was added to perform a third condensation reaction. Thus, an asymmetric dioxazine compound represented by the formula in the free acid form was obtained:

(6) 2-Aminonaphthalene-4,6,8-trisulfonic acid
(7) N-Methylaniline
(8) N-Ethylaniline
(9) m-Toluidine
(10) p-Toluidine
(11) m-Chloroaniline
(12) p-Anisidine
(13) p-Aminobenzoic acid
(14) 1-Aminobenzene-3-β-sulfatoethylsulfone
(15) 1-Aminobenzene-4-β-sulfatoethylsulfone

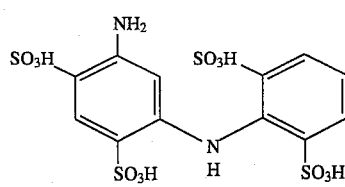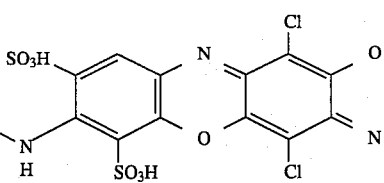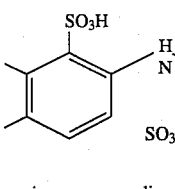

(λmax: 629 nm in aqueous medium)

EXAMPLE 4

The asymmetric dioxazine compound obtained in Example 1 (45.5 parts) was added to water (500 parts). After adding aniline (2.8 parts) thereto, a condensation reaction was carried out at pH 2–7 at 40°–80° C. to obtain an asymmetric dioxazine compound represented by the following formula in the free acid form:

EXAMPLE 6

Example 3 can be repeated, except that the dioxazine intermediate and 1-aminobenzene-3-β-sulfatoethylsulfone used in Example 3 are replaced with the compounds shown in Column 2 and Column 3, respectively, of the table of Example 2, and the 1-aminobenzene-2,5-disulfonic acid used in Example 3 is replaced with each of the following 17

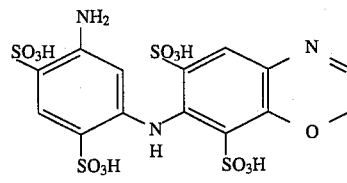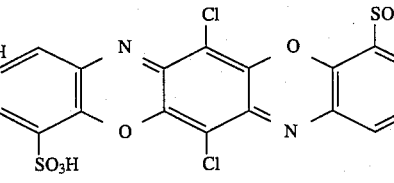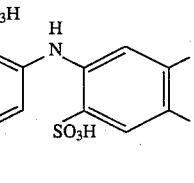

(λmax: 630 nm in aqueous medium)

EXAMPLE 5

Example 4 can be repeated, except that the asymmetric dioxazine compound and aniline used in Example 4 are replaced with each of the 36 kinds of asymmetric dioxazine compounds obtained in Example 2 and each of the following 15 kinds of amines, respectively. Thus, corresponding asymmetric dioxazine compounds can be obtained.
(1) Aniline
(2) Metanilic acid
(3) Sulfanilic acid
(4) 1-Aminonaphthalene-3,6-disulfonic acid
(5) 2-Aminonaphthalene-4,8-disulfonic acid kinds of amines. Thus, corresponding asymmetric dioxazine compounds can be obtained.
(1) 1-Aminobenzene-2,5-disulfonic acid
(2) 1-Aminobenzene-2,4-disulfonic acid
(3) Orthanilic acid
(4) 1-Aminonaphthalene-4,6,8-trisulfonic acid
(5) 2-Aminonaphthalene-1,5-disulfonic acid
(6) 2-Aminonaphthalene-3,6,8-trisulfonic acid
(7) o-Aminobenzoic acid
(8) Ammonia
(9) Ethylamine
(10) β-Hydroxyethylamine
(11) β-Alanine

(12) Taurine
(13) N-Methyltaurine
(14) $NH_2C_2H_4OC_2H_4SO_2C_2H_4OSO_3H$
(15) $NH_2C_2H_4OC_2H_4SO_2CH=CH_2$
(16) $NH_2C_2H_4SO_2C_2H_4Cl$
(17) $NH_2C_2H_4SO_2C_2H_4OSO_3H$.

EXAMPLE 7

Example 3 can be repeated, except that the 1-aminobenzene-2,5-disulfonic acid used in Example 3 is replaced with an equimolar quantity of each of the amines (2)–(17) in Example 6. Thus, corresponding asymmetric dioxazine compounds can be obtained.

EXAMPLE 8

Example 4 can be repeated, except that aniline used in Example 4 is replaced with an equimolar quantity of each of the amines (2)–(15) in Example 5. Thus, corresponding asymmetric dioxazine compounds can be obtained.

EXAMPLE 9

Example 1 was repeated, except that cyanuric chloride used in Example 1 was replaced with an equimolar quantity of 2-methoxy-4,6-dichloro-s-triazine to obtain an asymmetric dioxazine compound represented by the following formula in the free acid form:

chloride (5.5 parts). The mixture was stirred at pH 5–6 at 10°–20° C. After the reaction, the reaction mixture was salted out with sodium chloride to obtain an asymmetric dioxazine compound represented by the following formula in the free acid form:

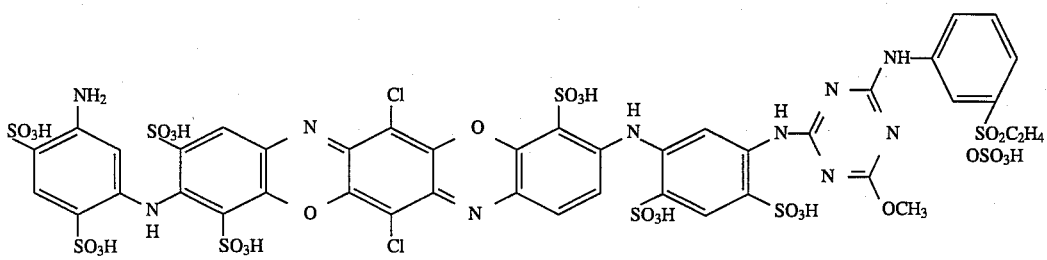

(λmax: 625 nm in aqueous medium)

EXAMPLE 10

An asymmetric dioxazine intermediate (33.8 parts) represented by the following formula in the free acid form:

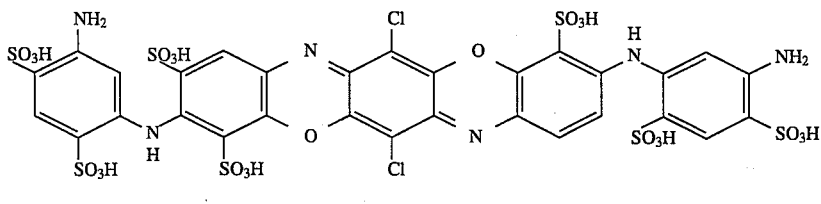

(λmax: 623 nm in aqueous medium)

was added to water (200 parts), to which was added cyanuric

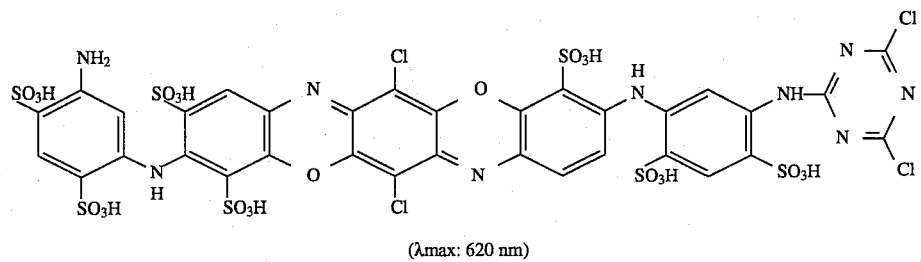

(λmax: 620 nm)

EXAMPLE 11

Example 10 was repeated, except that the dioxazine intermediate and cyanuric chloride used in Example 10 were replaced with the compounds shown in Column 2 and Column 3, respectively, of the following table. Thus, corresponding asymmetric dioxazine compounds were obtained. When used for dyeing, these compounds gave dyed products of which hues were as shown in Column 4 of the following table.

-continued

| Run No. | Column 2 | Column 3 | Column 4 |
|---------|----------|----------|----------|
| 6 | [structure] | " | " |
| 7 | [structure] | [cyanuric chloride structure] | Blue |
| 8 | [structure] | " | " |
| 9 | [structure] | [trichloropyrimidine structure] | " |

EXAMPLE 12

Example 1 was repeated, except that the dioxazine intermediate, cyanuric chloride and 1-aminobenzene-3-β-sulfatoethylsulfone used in Example 1 were replaced with the compounds shown in Column 2, Column 3 and Column 4, respectively, of the following table to obtain corresponding asymmetric dioxazine compounds. When used for dyeing, these compounds gave dyed products of which hues were as shown in Column 5 of the following table.

| Run No. | Column 2 | Column 3 | Column 4 | Column 5 |
|---|---|---|---|---|
| 1 | | | NH₂C₂H₄OH | Blue |
| 2 | " | " | (N-methylaniline) | " |
| 3 | " | " | (3-aminobenzenesulfonic acid) | " |
| 4 | | | (2-aminobenzoic acid) | Blue |
| 5 | " | | NH₂C₂H₅ | " |
| 6 | " | | NH₂C₂H₄SO₃H | " |
| 7 | | | (aniline) | Blue |

-continued

| Run No. | Column 2 | Column 3 | Column 4 | Column 5 |
|---|---|---|---|---|
| 8 | " | trifluorotriazine | CH₃—NHC₂H₄SO₃H | " |
| 9 | (bis-aminonaphthol structure with Cl, SO₃H, NH₂ substituents) | cyanuric chloride | NH₂C₂H₄OH | " |
| 10 | (bis-aminonaphthol structure with Cl, SO₃H, NH₂ substituents) | cyanuric chloride | NH₃ | Blue |
| 11 | " | " | 3-aminobenzenesulfonic acid | " |
| 12 | (bis-aminonaphthol structure with Cl, SO₃H, NH₂, CH₃ substituents) | " | NH₂C₂H₅ | " |

EXAMPLE 13

The asymmetric dioxazine compound obtained in Example 1 (45.5 parts) was added to water (500 parts). After adding 3-carboxypyridine (3.7 parts) thereto, a substitution reaction was carried out at pH 2–5 at 40°–80° C. Thus, an asymmetric dioxazine compound represented by the following formula in the free acid form was obtained:

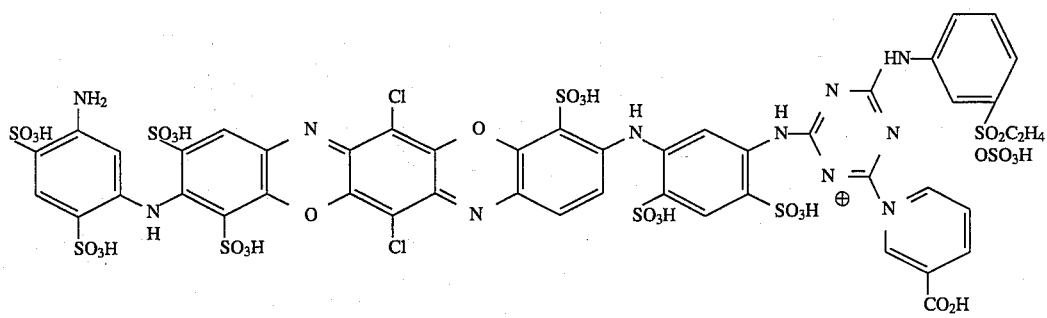

(λmax: 622 nm)

EXAMPLE 14

Example 13 can be repeated, except that the asymmetric dioxazine compound and 3-carboxypyridine used in Example 13 are replaced with each of the asymmetric dioxazine compounds used in Example 13 each of the following 10 kinds of amines respectively. Thus, corresponding asymmetric dioxazine compounds can be obtained.

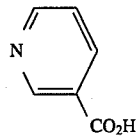 (1)

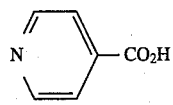 (2)

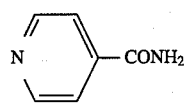 (3)

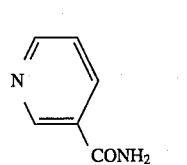 (4)

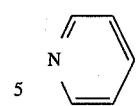 (5)

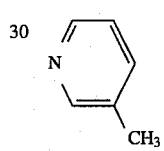 (6)

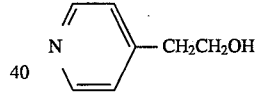 (7)

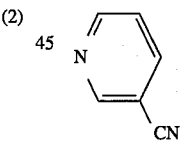 (8)

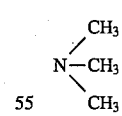 (9)

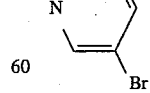 (10)

EXAMPLE 15

An asymmetric dioxazine intermediate (33.7 parts) represented by the following formula in the free acid form:

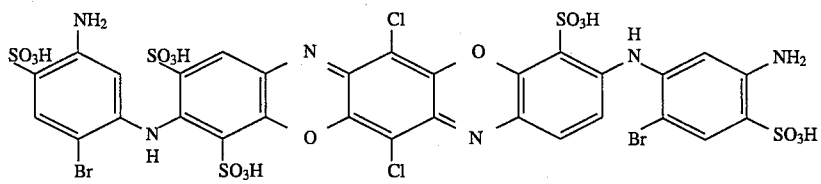

(λmax 620 nm)

was added to water (300 parts). After adding cyanuric chloride (5.5 parts) thereto, the mixture was stirred at pH 5–6 at 10°–20° C. until the reaction was completed. Then, monoethanolamine (1.8 parts) was added, and the resulting mixture was stirred at pH 7–8 at 20°–50° C. until the reaction was completed. Then, 3-carboxypyridine (3.7 parts) was added and the resulting mixture was stirred at pH 2–5 at 40°–80° C. to carry out a substitution reaction. Thus, an asymmetric dioxazine compound represented by the following formula in the free acid form was obtained:

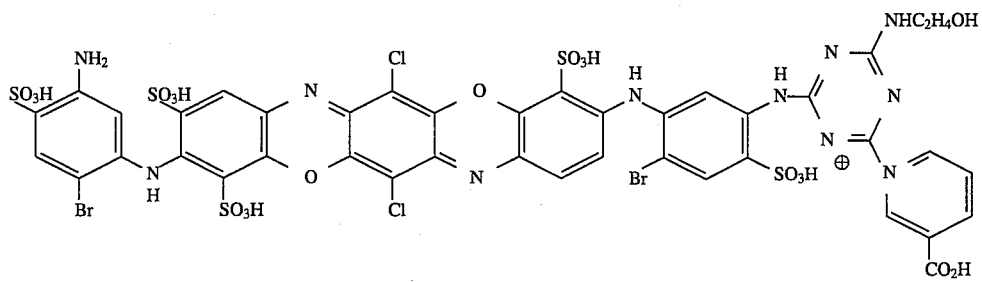

(λmax 625 nm)

EXAMPLE 16

Example 15 was repeated, except that the dioxazine intermediate, monoethanolamine and 3-carboxypyridine used in Example 15 were replaced with the compounds shown in Column 2, Column 3 and Column 4, respectively, of the following table, to obtain corresponding asymmetric dioxazine compounds. When used for dyeing, these compounds gave dyed products of which hues were as shown in Column 5 of the following table.

| Run No. | Column 2 | Column 3 | Column 4 | Column 5 |
|---|---|---|---|---|
| 1 | (complex bis-aryl structure with Br, NH₂, SO₃H groups linked through dichloro-dioxo-diimino central ring to aminobenzene disulfonic acid) | NH₂C₂H₄OH | nicotinic acid (pyridine-3-CO₂H) | Blue |
| 2 | " | NH₂C₂H₅ | " | " |
| 3 | " | NH₂C₂H₄SO₃H | " | " |
| 4 | (similar structure with SO₃H instead of Br) | NH₂C₂H₄SO₃H | nicotinamide (pyridine-3-CONH₂) | Blue |
| 5 | " | aniline (C₆H₅NH₂) | picolinic acid (pyridine-2-CO₂H) | " |
| 6 | " | 3-aminobenzenesulfonic acid | " | " |
| 7 | (similar structure with SO₃H) | NH₃ | nicotinic acid (pyridine-3-CO₂H) | Blue |

| Run No. | Column 2 | Column 3 | Column 4 | Column 5 |
|---|---|---|---|---|
| 8 | (structure) | NH₂C₂H₅ | " | " |
| 9 | (structure) | CH₃CH₂—NH—C₂H₅ | (pyridine-4-CO₂H) | " |
| 10 | (structure) | CH₃—NHC₂H₄SO₃H | (pyridine-3-CO₂H) | Blue |
| 11 | " | NH₂C₂H₄OSO₃H | (pyridine-4-CONH₂) | " |
| 12 | (structure) | NH₂C₂H₄SO₃H | (pyridine-3-CO₂H) | " |

EXAMPLE 17

Example 2 can be repeated, except that cyanuric chloride used in Example 2 is replaced with an equimolar quantity of each of the following 5 kinds of triazine compounds. Thus, corresponding asymmetric dioxazine compounds can be obtained.

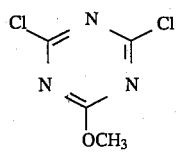
(1)

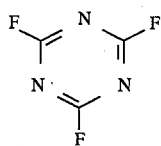
(2)

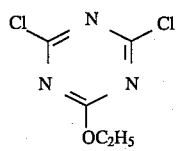
(3)

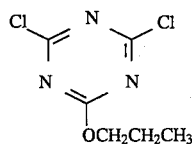
(4)

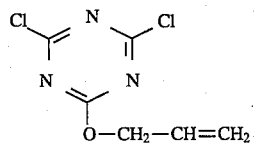
(5)

Dyeing Example 1

Each of the asymmetric dioxazine compounds obtained in Example 10 and Example 11 (0.1, 0.3 and 0.6 part portions of every compound) was dissolved into water (200 parts). After adding sodium sulfate (10 parts) and cotton (10 parts) thereto, the temperature was elevated to 50° C., sodium carbonate (4 parts) was added, and dyeing was carried out for one hour. By washing the dyed cotton with water, soaped, again washed with water and dried, there was obtained a blue-colored dyed product excellent in fastnesses, particularly chlorine fastness, and having an excellent build-up property.

Dyeing Example 2

Using each of the asymmetric dioxazine compounds obtained in Examples 1–4, 9 and Examples 13, 15–16 (0.1, 0.3 and 0.6 part portions of every compound), dyeing was carried out in the same manner as in Dyeing Example 1, except that the dyeing temperature was 60° C. As the result, blue colored dyed products similarly excellent in fastness properties and build-up property were obtained.

Dyeing Example 3

Using each of the asymmetric dioxazine compounds obtained in Example 12 (0.1, 0.3 and 0.6 part portions of every compound), dyeing was carried out in the same manner as in Dyeing Example 1, except that the dyeing temperature was 80° C. As the result, blue colored dyed products similarly excellent in fastness properties and build-up property were obtained.

Dyeing Example 4

Using each of the asymmetric dioxazine compounds obtained in Examples 1–4, 9, 15–16, color pastes having the following composition were prepared:

| | |
|---|---|
| Asymmetric dioxazine compound | 5 parts |
| Urea | 5 parts |
| Sodium alginate (5%) stock paste | 50 parts |
| Hot water | 25 parts |
| Sodim bicarbonate | 2 parts |
| Balance | 13 parts |

A mercerized cotton broad cloth was printed with each color paste. After intermediate drying, it was steamed at 100° C. for 5 minutes, washed with hot water, soaped, again washed with hot water and dried. The dyed products thus obtained were excellent in fastness properties, particularly chlorine fastness, and build-up property.

What is claimed is:

1. An asymmetric dioxazine compound represented by the following formula (I) in the free acid form:

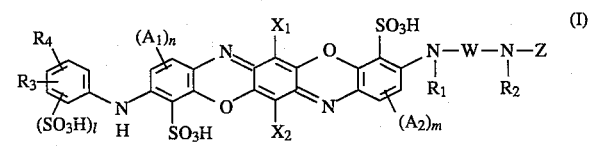
(I)

wherein $A_1$ and $A_2$ independently of one another are each sulfo, halo, alkyl or alkoxy, W is an unsubstituted or substituted aliphatic or aromatic bridging group, $X_1$ and $X_2$ independently of one another are each hydrogen, halo, alkyl, alkoxy or phenoxy, $R_1$ and $R_2$ independently of one another are each hydrogen or unsubstituted or substituted alkyl, $R_3$ and $R_4$ independently of one another are each hydrogen, halo, alkyl, alkoxy or amino which is unsubstituted or substituted once or twice by $C_{1-C2}$ alkyl, Z is a fiber-reactive group, m and n independently of one another are each 0 or 1, provided that m≠n, and l is 1 or 2.

2. A compound according to claim 1, wherein the fiber-reactive group represented by Z is either one group represented by the following formulas (II), (III) or (IV):

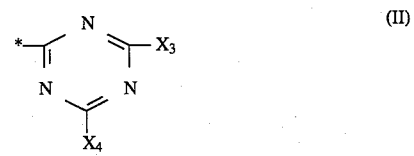
(II)

wherein $X_3$ and $X_4$ are each independently chloro, fluoro,

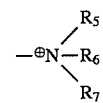

($R_5$, $R_6$ and $R_7$ are each independently unsubstituted or substituted alkyl) or

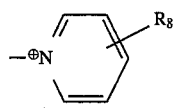

($R_8$ is hydrogen, cyano, carbamoyl, halogen, carboxy, sulfo, hydroxy, vinyl or, unsubstituted or substituted alkyl), and the mark * is a bond linking to

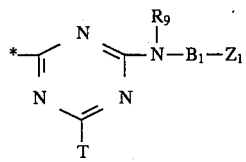

wherein $B_1$ is an unsubstituted or substituted phenylene, alkylene or naphthylene group, $R_9$ is hydrogen or unsubstituted or substituted alkyl, $Z_1$ is —SO$_2$CH═CH$_2$ or —SO$_2$CH$_2$CH$_2$Y$_1$ ($Y_1$ is a group capable of being split by the action of an alkali), T is halo, alkoxy,

($R_{10}$ and $R_{11}$ are each independently hydrogen or an unsubstituted or substituted alkyl, phenyl, naphthyl or benzyl group),

($R_5$, $R_6$ and $R_7$ are as defined above),

($R_8$ is as defined above) or

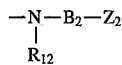

[$B_2$ is an unsubstituted or substituted phenylene, alkylene or naphthylene group, $R_{12}$ is hydrogen or unsubstituted or substituted alkyl and $Z_2$ is —SO$_2$CH═CH$_2$ or —SO$_2$CH$_2$CH$_2$Y$_2$ ($Y_2$ is a group capable of being split by the action of an alkali)] and the mark * is as defined above;

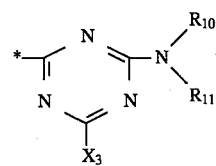

wherein $X_3$, $R_{10}$, $R_{11}$ and the mark * are as defined above.

3. A compound according to claim 1, wherein the fiber-reactive group represented by Z is a group represented by the following formula (V):

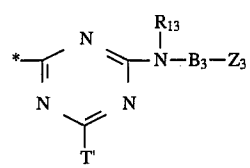

wherein $B_3$ is an unsubstituted or substituted phenylene, alkylene or naphthylene group, $R_{13}$ is hydrogen or unsubstituted or substituted alkyl and $Z_3$ is —SO$_2$CH═CH$_2$ or —SO$_2$CH$_2$CH$_2$Y$_3$ ($Y_3$ is a group capable of being split by the action of an alkali) and T' is chloro, fluoro, alkoxy,

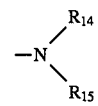

($R_{14}$ is hydrogen or unsubstituted or substituted alkyl and $R_{15}$ is hydrogen or an unsubstituted or substituted alkyl, phenyl or naphthyl group),

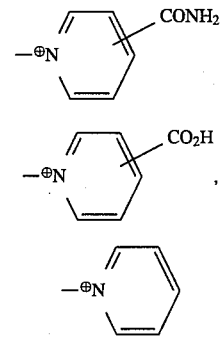

or

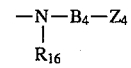

($B_4$ is an unsubstituted or substituted phenylene, alkylene or naphthylene group, $R_{16}$ is hydrogen or unsubstituted or substituted alkyl, $Z_4$ is —SO$_2$CH═CH$_2$ or —SO$_2$CH$_2$CH$_2$Y$_4$ ($Y_4$ is a group capable of being split by the action of an alkali)); and the mark * represents a bond linking to

4. A compound according to claim 1, wherein $X_1$ and $X_2$ are each independently chloro or bromo.

5. A compound according to claim 1, wherein $R_1$ and $R_2$ are each independently hydrogen.

6. A compound according to claim 1, wherein W is phenylene substituted once or twice by sulfo, or W is ethylene or propylene.

7. A compound according to claim 1, wherein $A_1$ and $A_2$ are each sulfo.

8. A compound according to claim 1, wherein either one of $R_3$ and $R_4$ is amino unsubstituted or substituted once or twice by $C_1$–$C_4$ alkyl.

9. A compound according to claim 1, wherein W is phenylene substituted once or twice by sulfo.

10. A method for dyeing or printing a fiber material which comprises applying the asymmetric dioxazine compound according to claim 1 to a fiber material.

* * * * *